UNITED STATES PATENT OFFICE.

LYMAN WOODRUFF, OF ELLENSBERG, OREGON.

IMPROVEMENT IN METHODS OF CURING FISH.

Specification forming part of Letters Patent No. 204,647, dated June 4, 1878; application filed February 16, 1878.

*To all whom it may concern:*

Be it known that I, LYMAN WOODRUFF, of Ellensberg, county of Curry, and State of Oregon, have invented an Improved Method of Curing Fish; and I do hereby declare the following description and accompanying drawings are sufficient to enable any person skilled in the art or science to which it most nearly appertains to make and use my said invention without further invention or experiment.

My invention has reference to a novel method of preparing fish which it is intended to cure by smoking or drying, whereby I am able to retain the original flavor, color, and plumpness of the fish.

After the fish is caught I open and clean it. I then place it in clean lime-water, in which I let it remain for about twenty minutes. After removing it from the lime-water I wash it clean and place it on the table, flesh side up, where I let it lie for about ten minutes, when I wipe it dry, both inside and outside, with a clean dry cloth.

For an ordinary salmon weighing, say, sixteen (16) pounds, I then take one tea-spoonful of finely-ground black pepper and rub it well into the flesh side of the fish; next I rub in one-fourth of a tea-spoonful of pulverized saltpeter in the same way, and then one table-spoonful of fine salt. These substances I rub in separately, rubbing each one until it disappears. The fish having been thus prepared I sprinkle a thin layer of brown sugar over it and fold the two sides together. I let it lie in this condition for about twelve hours, when I wipe the back of the fish dry and apply a coating of linseed-oil to the back with a paint-brush, when it is ready to be smoked.

In smoking the fish I commence by creating a heavy smoke, and allow it to gradually subside in quantity until the proper volume is obtained, in order to keep off the flies.

I am aware that the several steps in my process or method of curing fish are old when taken separately, and therefore I do not claim them broadly and separately, but when combined.

Having thus described my invention, what I claim, and desire to secure by Letters Patent, is—

The process above described for treating and curing the fish, consisting in cleaning the fish and immersing it in lime-water, then washing and wiping dry, then rubbing the flesh side successively with black pepper, pulverized saltpeter, and fine salt in the proportions set forth until each in turn disappears or is absorbed, then sprinkling with brown sugar and folding the sides together, allowing the fish to lie in this condition for about twelve hours, when the back is wiped dry and coated with linseed-oil, substantially as described.

In witness whereof I have hereunto set my hand and seal.

LYMAN WOODRUFF. [L. S.]

Witnesses:
    J. HUNTLEY,
    THOS. VAN PELT.